United States Patent [19]
Kwon

[11] Patent Number: 5,536,920
[45] Date of Patent: Jul. 16, 1996

[54] INVERTER POWER CONTROL CIRCUIT FOR HIGH-FREQUENCY HEATING APPARATUS

[75] Inventor: Kyoung A. Kwon, Seoul, Rep. of Korea

[73] Assignee: LG Electronics Inc., Rep. of Korea

[21] Appl. No.: 442,118

[22] Filed: May 16, 1995

[30] Foreign Application Priority Data

May 17, 1994 [KR] Rep. of Korea ............... 10844/1994

[51] Int. Cl.$^6$ ........................... H05B 6/08; H02M 7/537
[52] U.S. Cl. ........................ 219/663; 219/625; 363/17; 363/98; 363/132
[58] Field of Search ........................ 219/663, 664, 219/665, 661, 625, 626; 363/17, 98, 132

[56] References Cited

U.S. PATENT DOCUMENTS

| | | | |
|---|---|---|---|
| 4,555,608 | 11/1985 | Mizukawa et al. | 219/663 |
| 4,617,622 | 10/1986 | Fox | 363/98 |
| 5,182,702 | 1/1993 | Hiramatsu et al. | 363/132 |
| 5,248,866 | 9/1993 | Tanaka et al. | 219/663 |
| 5,354,971 | 10/1994 | Chen | 219/661 |

Primary Examiner—Philip H. Leung
Attorney, Agent, or Firm—Ostrolenk, Faber, Gerb & Soffen

[57] ABSTRACT

An inverter power control circuit for a high-frequency heating apparatus of a half-bridge type which comprises an inverter. The inverter power control circuit comprises a first current transformer for detecting a current flowing through a first free-wheeling diode in the inverter, a second current transformer for detecting a current flowing through a second free-wheeling diode in the inverter, a pulse supply circuit for supplying a pulse to drive the circuit at an initial state, an ON time control signal generator for generating an ON time control signal to control ON times of first and second switching devices in the inverter, a first drive controller for outputting a first drive control signal in response to the current detected by the first current transformer, the pulse from the pulse supply circuit and the ON time control signal from the ON time control signal generator to control the ON time of the first switching device in the inverter to control the power of the inverter, and a second drive controller for outputting a second drive control signal in response to the current detected by the second current transformer and the ON time control signal from the ON time control signal generator to control the ON time of the second switching device in the inverter to control the power of the inverter.

5 Claims, 7 Drawing Sheets

1

INVERTER POWER CONTROL CIRCUIT FOR HIGH-FREQUENCY HEATING APPARATUS

BACKGROUND OF THE INVENTION

1. Field of the Invention

The present invention relates in general to a high-frequency heating apparatus of a half-bridge type, and more particularly to an inverter power control circuit for the high-frequency heating apparatus which is capable of detecting conducting currents of free-wheeling diodes and setting ON times in accordance with the detected result, so that a zero voltage switching operation can stably be performed to control a power of an inverter.

2. Description of the Prior Art

Referring to FIG. 1, there is shown a schematic view illustrating a conventional inverter control circuit for a high-frequency heating apparatus. As shown in this drawing, the conventional inverter control circuit comprises an inverter 1 for inducing a commercial alternating current (referred to hereinafter as AC) power to a high-frequency current in response to drive signals DS1 and DS2 to heat a container 2. To this end, the inverter 1 includes a bridge diode BD1, capacitors C1 and C2, a working coil HL1 and transistors Q1 and Q2.

The conventional inverter control circuit further comprises a phase comparator 3 for comparing phases of voltages at both sides A and B of the working coil HL1 in the inverter 1 with each other and outputting a signal in accordance with the compared result, an initializer 4 for generating a signal for initial driving of the inverter control circuit, a voltage detector 5 for detecting the voltages at both the sides A and B of the working coil HL1 in the inverter 1 and outputting a control signal in accordance with the detected result, a switching circuit 6 being switched in response to the control signal from the voltage detector 5 to select one of an output signal from the phase comparator 3 and an output signal from the initializer 4, a voltage controlled oscillator 7 for adjusting a phase of an oscillating frequency according to a level of an output signal from the switching circuit 6 and outputting the resultant signal, and an inverter driver 8 for outputting the drive signals DS1 and DS2 to the inverter 1 in response to an output signal from the voltage controlled oscillator 7 to drive it.

Referring to FIG. 2, there is shown a detailed circuit diagram of the initializer 4 and the voltage detector 5 in FIG. 1. As shown in this drawing, the initializer 4 includes a pulse generator 14 for generating a pulse, an analog switch 24 being switched in response to the pulse from the pulse generator 14, and a buffer 34 for buffering a voltage at a node between a capacitor C4 and a resistor R13 in response to the switching operation of the analog switch 24 and outputting the buffered voltage to the switching circuit 6.

The voltage detector 5 includes a first comparison circuit 15 for detecting the voltage at the one side A of the working coil HL1 in the inverter 1 and comparing the detected voltage with a zero voltage. To this end, the first comparison circuit 15 includes resistors R1 and R2 and a comparator CP1.

The voltage detector 5 further includes a second comparison circuit 25 for detecting the voltage at the other side B of the working coil HL1 in the inverter 1 and comparing the detected voltage with the zero voltage. To this end, the second comparison circuit 25 includes resistors R3 and R4 and a comparator CP2.

2

The voltage detector 5 further includes an exclusive-OR gate 35 for exclusive-ORing output signals from the first and second comparison circuits 15 and 25, and a signal delay circuit 45 for delaying an output signal from the exclusive-OR gate 35 for a predetermined time period. To this end, the signal delay circuit 45 includes a resistor R5 and a capacitor C3.

The voltage detector 5 further includes third and fourth comparison circuits 55 and 65. The third comparison circuit 55 includes resistors R6 and R7 for dividing a supply voltage Vcc, and a comparator CP3 for comparing an output signal from the signal delay circuit 45 with the divided voltage from the resistors R6 and R7. The fourth comparison circuit 65 includes resistors R8 and R9 for dividing the supply voltage Vcc, and a comparator CP4 for comparing the output signal from the signal delay circuit 45 with the divided voltage from the resistors R8 and R9.

The voltage detector 5 further includes an AND gate 75 for inputting output signals from the third and fourth comparison circuits 55 and 65 and the pulse from the pulse generator 14 in the initializer 4. The AND gate 75 also inputs the supply voltage Vcc through a resistor R12. Then, the AND gate 75 ANDs the inputted signals and outputs the resultant signal as the control signal to the switching circuit 6.

The operation of the conventional inverter control circuit for the high-frequency heating apparatus with the above-mentioned construction will hereinafter be described with reference to FIGS. 3A to 3G which are waveform diagrams of the input and output signals in the components in FIGS. 1 and 2.

First, for a time period $T_1$ as shown in FIG. 3, in the initializer 4, the analog switch 24 is switched in response to an initial drive pulse from the pulse generator 14, thereby causing a voltage previously charged on the capacitor C4 to be applied to a non-inverting input terminal (+) of the buffer 34 which is an operational amplifier.

Because an output terminal of the buffer 34 is connected to an inverting input terminal (−) thereof, an output voltage therefrom is fed back to the inverting input terminal (−).

As a result, the voltage previously charged on the capacitor C4 is buffered by the buffer 34 according to the feedback operation of the buffer 34 and then applied to one fixed terminal b of a switch SW2 of the switching circuit 6.

At this time, in the switching circuit 6, a movable terminal c of the switch SW2 is connected to the one fixed terminal b thereof in response to the control signal which is generated from the voltage detector 5 as will be mentioned later in detail.

As the movable terminal c of the switch SW2 in the switching circuit 6 is connected to the one fixed terminal b thereof, the buffered voltage from the buffer 34 in the initializer 4 is transferred to the voltage controlled oscillator 7 through the switch SW2 in the switching circuit 6.

The voltage controlled oscillator 7 oscillates a frequency based on the voltage transferred through the switching circuit 6 and outputs the oscillating frequency to the inverter driver 8. In response to the output frequency from the voltage controlled oscillator 7, the inverter driver 8 outputs the drive signals DS1 and DS2 to the inverter 1. At this time, the drive signal DS1 from the inverter driver 8 is high in level as shown in FIG. 3G and the drive signal DS2 therefrom is low in level as shown in FIG. 3F.

In the inverter 1, the transistor Q1 is turned on in response to the high level drive signal DS1 from the inverter driver 8, whereas the transistor Q2 is turned off in response to the low level drive signal DS2 from the inverter driver 8.

On the other hand, the 110/220 V, 50/60 Hz commercial AC power is sequentially rectified and smoothed by the bridge diode BD1 and the capacitor C1. The resultant direct current (referred to hereinafter as DC) power is applied to the working coil HL1 through the turned-on transistor Q1.

As a result, the high-frequency current $I_K$ as shown in FIG. 3B flows through the working coil HL1, thereby causing a current to be induced in the container 2. The induced current generates a Joule heat in the container 2, so as to heat food contained in the container 2.

At this time, voltages with a phase difference of 90° as shown in FIG. 3A appear at both the sides A and B of the working coil HL1.

Namely, a voltage as shown by a dotted line in FIG. 3A appears at the one side A of the working coil HL1 and a voltage as shown by a solid line in FIG. 3A appears at the other side B of the working coil HL1. At this time, the voltage appearing at the other side B of the working coil HL1 is a voltage being charged on the capacitor C2.

The voltage detector 5 detects the voltages at both the sides A and B of the working coil HL1 in the inverter 1 and outputs the control signal as a result of the detection to the switch SW2 in the switching circuit 6.

In detail, in the voltage detector 5, the voltage at the one side A of the working coil HL1 in the inverter 1 is supplied to the first comparison circuit 15. Then in the first comparison circuit 15, the supplied voltage is divided by the resistors R1 and R2 and then applied to a non-inverting input terminal (+) of the comparator CP1, an inverting input terminal (−) of which is applied with the zero voltage. The comparator CP1 compares the inputted voltages at its inverting and non-inverting input terminals (−) and (+) with each other and outputs the resultant value.

The voltage at the other side B of the working coil HL1 in the inverter 1 is supplied to the second comparison circuit 25. Then in the second comparison circuit 25, the supplied voltage is divided by the resistors R3 and R4 and then applied to a non-inverting input terminal (+) of the comparator CP2, an inverting input terminal (−) of which is applied with the zero voltage. The comparator CP2 compares the inputted voltages at its inverting and non-inverting input terminals (−) and (+) with each other and outputs the resultant value.

The exclusive-OR gate 35 exclusive-ORes the output values from the comparators CP1 and CP2 in the first and second comparison circuits 15 and 25 and outputs the resultant signal as shown in FIG. 3D. The output signal from the exclusive-OR gate 35 goes from low to high in level for the time period $T_1$ as shown in FIG. 3D.

The output signal from the exclusive-OR gate 35 is delayed by a time constant of the resistor R5 and the capacitor C3 in the signal delay circuit 45 as shown in FIG. 3E and then applied in common to the third and fourth comparison circuits 55 and 65.

In the third comparison circuit 55, the supply voltage Vcc is divided by the resistors R6 and R7 and then applied to an inverting input terminal (−) of the comparator CP3, a non-inverting input terminal (+) of which is applied with the output voltage from the signal delay circuit 45. The comparator CP3 compares the inputted voltages at its inverting and non-inverting input terminals (−) and (+) with each other and outputs the resultant value.

In the fourth comparison circuit 65, the supply voltage Vcc is divided by the resistors R8 and R9 and then applied to a non-inverting input terminal (+) of the comparator CP4, an inverting input terminal (−) of which is applied with the output voltage from the signal delay circuit 45. The comparator CP4 compares the inputted voltages at its inverting and non-inverting input terminals (−) and (+) with each other and outputs the resultant value.

The output values from the comparators CP3 and CP4 are passed through resistors R10 and R11, respectively, and then added to the supply voltage Vcc passed through the resistor R12. The resultant value is applied to one input terminal of the AND gate 75.

The AND gate 75 also inputs the output value from the pulse generator 14 in the initializer 4 at its other input terminal. Then, the AND gate 75 ANDs the inputted values and outputs the resultant value as the control signal to the switch SW2 in the switching circuit 6. In response to the control signal from the AND gate 75, the movable terminal c of the switch SW2 in the switching circuit 6 is connected to the other fixed terminal a thereof.

On the other hand, the phase comparator 3 compares the phases of the voltages at both the sides A and B of the working coil HL1 in the inverter 1 with each other and outputs the signal as a result of the comparison to the other fixed terminal a of the switch SW2 in the switching circuit 6.

As the movable terminal c of the switch SW2 in the switching circuit 6 is connected to the other fixed terminal a thereof, the output signal from the phase comparator 3 is transferred to the voltage controlled oscillator 7 through the switch SW2 in the switching circuit 6. The voltage controlled oscillator 7 adjusts the phase of the oscillating frequency in response to the signal transferred through the switching circuit 6 and outputs the resultant oscillating frequency to the inverter driver 8.

In response to the oscillating frequency from the voltage controlled oscillator 7, the inverter driver 8 outputs the drive signals DS1 and DS2 to the inverter 1 for a time period $T_2$ as shown in FIG. 3. At this time, the drive signal DS1 from the inverter driver 8 is low in level as shown in FIG. 3G and the drive signal DS2 therefrom is high in level as shown in FIG. 3F.

Then, in the inverter 1, the transistor Q1 is turned off in response to the low level drive signal DS1 from the inverter driver 8, whereas the transistor Q2 is turned on in response to the high level drive signal DS2 from the inverter driver 8.

As the transistor Q1 is turned off and the transistor Q2 is turned on, the voltage as shown by the dotted line in FIG. 3A appears at the one side A of the working coil HL1 and the voltage as shown by the solid line in FIG. 3A appears at the other side B of the working coil HL1. At this time, the voltage appearing at the other side B of the working coil HL1 is a voltage being discharged from the capacitor C2.

As a result, a current $I_P$ as shown in FIG. 3C flows through the transistor Q2.

On the other hand, the voltage detector 5 detects the voltages at both the sides A and B of the working coil HL1 in the inverter 1 and outputs the control signal as a result of the detection to the switch SW2 in the switching circuit 6.

Namely, in the voltage detector 5, the voltage at the one side A of the working coil HL1 in the inverter 1 is supplied to the first comparison circuit 15. Then in the first comparison circuit 15, the supplied voltage is divided by the resistors R1 and R2 and then applied to the non-inverting input terminal (+) of the comparator CP1, the inverting input terminal (−) of which is applied with the zero voltage. The comparator CP1 compares the inputted voltages at its inverting and non-inverting input terminals (−) and (+) with each other and outputs the resultant value.

The voltage at the other side B of the working coil HL1 in the inverter 1 is supplied to the second comparison circuit 25. Then in the second comparison circuit 25, the supplied voltage is divided by the resistors R3 and R4 and then applied to the non-inverting input terminal (+) or the comparator CP2, the inverting input terminal (−) of which is applied with the zero voltage. The comparator CP2 compares the inputted voltages at its inverting and non-inverting input terminals (−) and (+) with each other and outputs the resultant value.

Then, the exclusive-OR gate 35 exclusive-ORes the output values from the comparators CP1 and CP2 in the first and second comparison circuits 15 and 25 and outputs the resultant signal as shown in FIG. 3D. The output signal from the exclusive-OR gate 35 goes from high to low in level for the time period $T_2$ as shown in FIG. 3D.

The output signal from the exclusive-OR gate 35 is delayed by the time constant of the resistor R5 and the capacitor C3 in the signal delay circuit 45 as shown in FIG. 3E and then applied in common to the third and fourth comparison circuits 55 and 65.

In the third comparison circuit 55, the supply voltage Vcc is divided by the resistors R6 and R7 and then applied to the inverting input terminal (−) of the comparator CP3, the non-inverting input terminal (+) of which is applied with the output voltage from the signal delay circuit 45. The comparator CP3 compares the inputted voltages at its inverting and non-inverting input terminals (−) and (+) with each other and outputs the resultant value.

In the fourth comparison circuit 65, the supply voltage Vcc is divided by the resistors R8 and R9 and then applied to the non-inverting input terminal (+) of the comparator CP4, the inverting input terminal (−) of which is applied with the output voltage from the signal delay circuit 45. The comparator CP4 compares the inputted voltages at its inverting and non-inverting input terminals (−) and (+) with each other and outputs the resultant value.

The output values from the comparators CP3 and CP4 are passed through the resistors R10 and R11, respectively, and then added to the supply voltage Vcc passed through the resistor R12. The resultant value is applied to the one input terminal of the AND gate 75.

The AND gate 75 also inputs the output value from the pulse generator 14 in the initializer 4 at its other input terminal. Then, the AND gate 75 ANDs the inputted values and outputs the resultant value as the control signal to the switch SW2 in the switching circuit 6. In response to the control signal from the AND gate 75, the movable terminal c of the switch SW2 in the switching circuit 6 remains connected to the other fixed terminal a thereof.

On the other hand, the phase comparator 3 compares the phases of the voltages at both the sides A and B of the working coil HL1 in the inverter 1 with each other and outputs the signal as a result of the comparison to the other fixed terminal a of the switch SW2 in the switching circuit 6.

As the movable terminal c of the switch SW2 in the switching circuit 6 remains connected to the other fixed terminal a thereof, the output signal from the phase comparator 3 is transferred to the voltage controlled oscillator 7 through the switch SW2 in the switching circuit 6. The voltage controlled oscillator 7 adjusts the phase of the oscillating frequency in response to the signal transferred through the switching circuit 6 and outputs the resultant oscillating frequency to the inverter driver 8.

In response to the oscillating frequency from the voltage controlled oscillator 7, the inverter driver 8 outputs the drive signals DS1 and DS2 to the inverter 1 for a time period $T_3$ as shown in FIG. 3. At this time, the drive signal DS1 from the inverter driver 8 is high in level as shown in FIG. 3G and the drive signal DS2 therefrom is low in level as shown in FIG. 3F.

Then, in the inverter 1, the transistor Q1 is turned on in response to the high level drive signal DS1 from the inverter driver 8, whereas the transistor Q2 is turned off in response to the low level drive signal DS2 from the inverter driver 8.

In this manner, the transistors Q1 and Q2 in the inverter 1 can accurately be turned on/off so that they can switch the zero voltage and a zero current.

In result, a switching frequency of the transistors Q1 and Q2 in the inverter 1 can automatically be in accord with the resonance frequency $f_o$ of the working coil HL1 and the capacitor C2 in the inverter 1 on the basis of the drive signals DS1 and DS2 from the inverter driver 8. Therefore, the power transfer can be performed at the maximum with no particular consideration of a capacity of the working coil HL1 which is greatly influenced by the induced current of the container 2.

Generally, the energy transfer can be carried out at the optimum under the condition of any container when the switching frequency of the inverter is in accord with the resonance frequency thereof.

As mentioned above, the switching operation can accurately be performed by the transistors Q1 and Q2 in the conventional inverter control circuit for the high-frequency heating apparatus. However, transistors in a conventional inverter power control circuit for the high-frequency heating apparatus are unable to perform accurately the above-mentioned switching operation.

Also in the conventional inverter power control circuit, the transistors may simultaneously be turned on due to an internal noise and a faulty operation of the circuit, resulting in a damage to the circuit. In order to prevent such a damage, a dead time or an interval that the transistors are simultaneously turned off is previously set in designing the circuit.

By the way, an energy path through the working coil and the resonance capacitor in the inverter may instantaneously be turned off in the dead time interval of the transistors, resulting in generation of a noise and a loss in the circuit. In order to solve such a problem, free-wheeling diodes FWD1 and FWD2 and capacitors C6 and C7 are connected in parallel to the switching devices Q1 and Q2 in the inverter, respectively, as shown in FIG. 4.

Current paths through the inverter in the dead time interval of the switching devices Q1 and Q2 in the inverter on the basis of the construction of FIG. 4 will hereinafter be described with reference to FIGS. 5A to 5D.

First, in the case where the switching device Q1 is turned on and the switching device Q2 is turned off, a current flows to the working coil HL1 and the resonance capacitor C2 through the turned-on switching device Q1.

Thereafter, when the switching device Q1 is turned off and the switching device Q2 remains at its OFF state, a current flows to a path for charging the capacitor C6, as shown in FIG. 5A.

From the moment that a voltage being charged on the capacitor C6 exceeds an input voltage Vdc, a reverse voltage is generated by the excess on the capacitor C7.

As the reverse voltage, for example, Vd is generated on the capacitor C7, a conducting voltage, namely, Vd is applied across the free-wheeling diode FWD2. As a result, a current flows through a repetitive loop of the free-wheeling diode FWD2, the working coil HL1 and the resonance capacitor C2 as shown in FIG. 5B.

At this time, the switching device Q2 is turned on under an external control when the free-wheeling diode FWD2 conducts. As a result, the current flows through the turned-on switching device Q2.

In the case where the switching device Q2 is turned off under the external control and the switching device Q1 remains at its OFF state, a current flows through a repetitive loop of the resonance capacitor C2, the working coil HL1 and the capacitor C7 as shown in FIG. 5C.

In this case, a voltage resulting from the current through the repetitive loop is charged on the capacitor C7. When the voltage being charged on the capacitor C7 exceeds the input voltage Vdc by the voltage Vd, a reverse voltage, namely, Vd is generated on the capacitor C6.

As a result, a conducting voltage, namely, Vd is applied across the free-wheeling diode FWD1, thereby causing a current to flow through a repetitive loop of the resonance capacitor C2, the working coil HL1 and the free-wheeling diode FWD1 as shown in FIG. 5D. At this time, the switching device Q1 is tuned on under the external control when the free-wheeling diode FWD1 conducts.

In this manner, the conventional inverter power control circuit for the high-frequency heating apparatus can perform the switching operation with no loss using the capacitors C6 and C7 and the free-wheeling diodes FWD1 and FWD2.

Also, in order to control the power of the inverter, the conventional inverter power control circuit is able to have a sufficient dead time interval to secure charging times of the capacitors C6 and C7, since the conducting currents of the free-wheeling diodes FWD1 and FWD2 flow until the voltages being charged on the capacitors C6 and C7 become equal to the input voltage Vdc, respectively.

However, the above-mentioned conventional inverter power control circuit has a disadvantage in that it must comprise a separate dead time setting circuit for providing the sufficient dead time interval to secure the charging times of the parallel capacitors to prevent the damage to the switching devices and meet the zero voltage switching condition of the switching devices.

Further in the conventional inverter power control circuit, the dead time interval necessary to the inverter may be different according to a variation in the input voltage and output voltages from the switching devices. For this reason, in the case where the dead time interval is set to a maximum value, conducting periods of the free-wheeling diodes may become too long after the charging of the parallel capacitors, resulting in an exaggerative increase in current stresses on the free-wheeling diodes.

For example, in the case where the switching devices have the same allowable peak current, the maximum output regulation is 95% when the dead time interval is 5%, and 90% when the dead time interval is 10%. As a result, an excessive dead time interval results in a limit in the regulation capability to the outputs of the switching devices and an increase in current stresses on the switching devices.

SUMMARY OF THE INVENTION

Therefore, the present invention has been made in view of the above problem, and it is an object of the present invention to provide an inverter power control circuit for a high-frequency heating apparatus which is capable of detecting conducting currents of free-wheeling dimes and setting ON times in accordance with the detected result, so that a zero voltage switching operation can stably be performed to control a power of an inverter.

In accordance with the present invention, in a high-frequency heating apparatus of a half-bridge type comprising an inverter, the inverter including first and second switching devices, a first free-wheeling diode and a first capacitor connected in parallel to the first switching device, a second free-wheeling diode and a second capacitor connected in parallel to the second switching device, and a working coil and a resonance capacitor connected in series to a node between the first and second capacitors, a node between the first and second free-wheeling diodes and a node between the first and second switching devices, respectively, there is provided a circuit for controlling a power of the inverter, comprising first current detection means for detecting a current flowing through the first free-wheeling diode in the inverter; second current detection means for detecting a current flowing through the second free-wheeling diode in the inverter; pulse supply means for supplying a pulse to drive the circuit at an initial state; ON time control signal generation means for generating an ON time control signal to control ON times of the first and second switching devices in the inverter; first drive control means for outputting a first drive control signal in response to the current detected by the first current detection means, the pulse from the pulse supply means and the ON time control signal from the ON time control signal generation means to control the ON time of the first switching device in the inverter to control the power of the inverter; and second drive control means for outputting a second drive control signal in response to the current detected by the second current detection means and the ON time control signal from the ON time control signal generation means to control the ON time of the second switching device in the inverter to control the power of the inverter.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
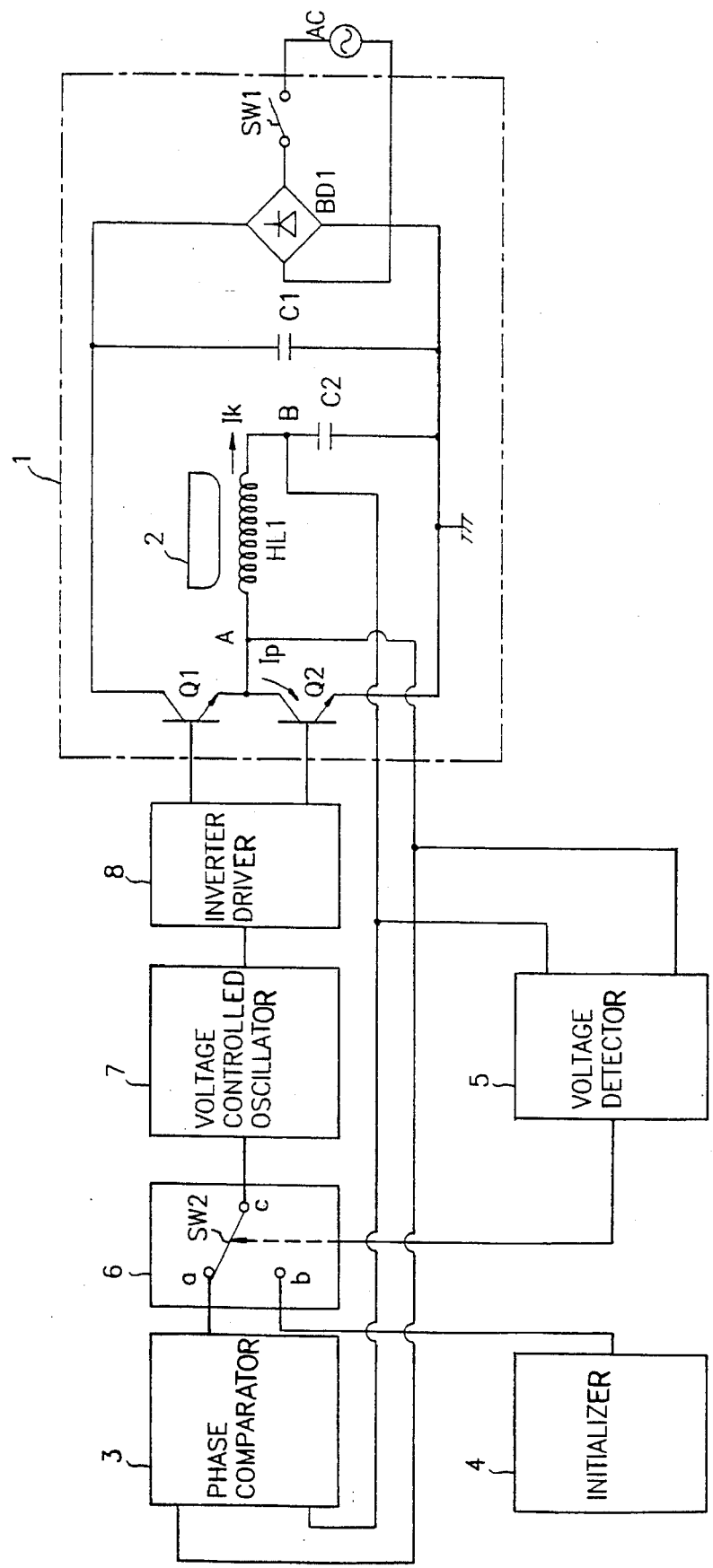
FIG. 1 is a schematic view illustrating a conventional inverter control circuit for a high-frequency heating apparatus.
Figure 2:
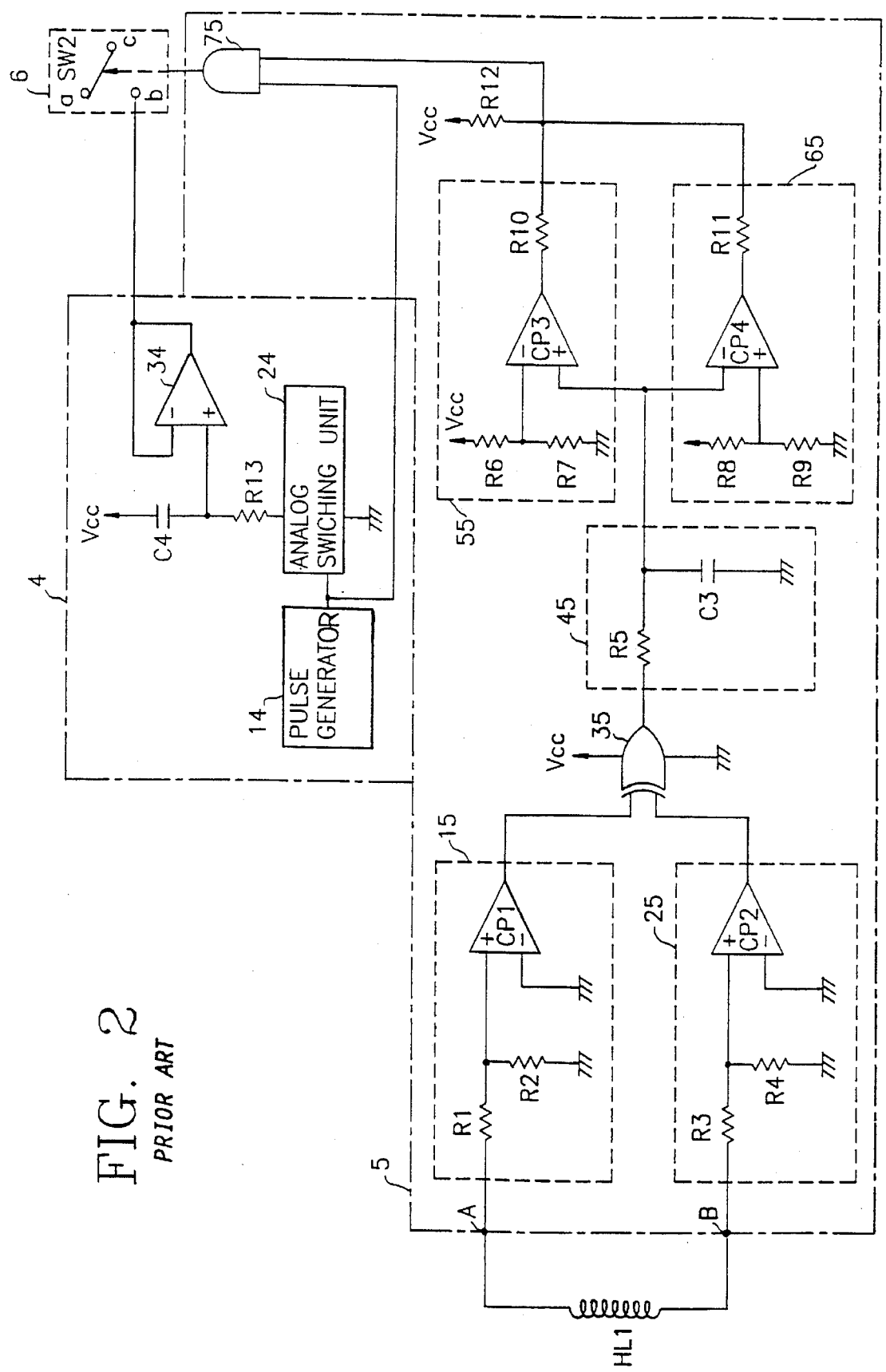
FIG. 2 is a detailed circuit diagram of an initializer and a voltage detector in FIG. 1.
Figure 3:
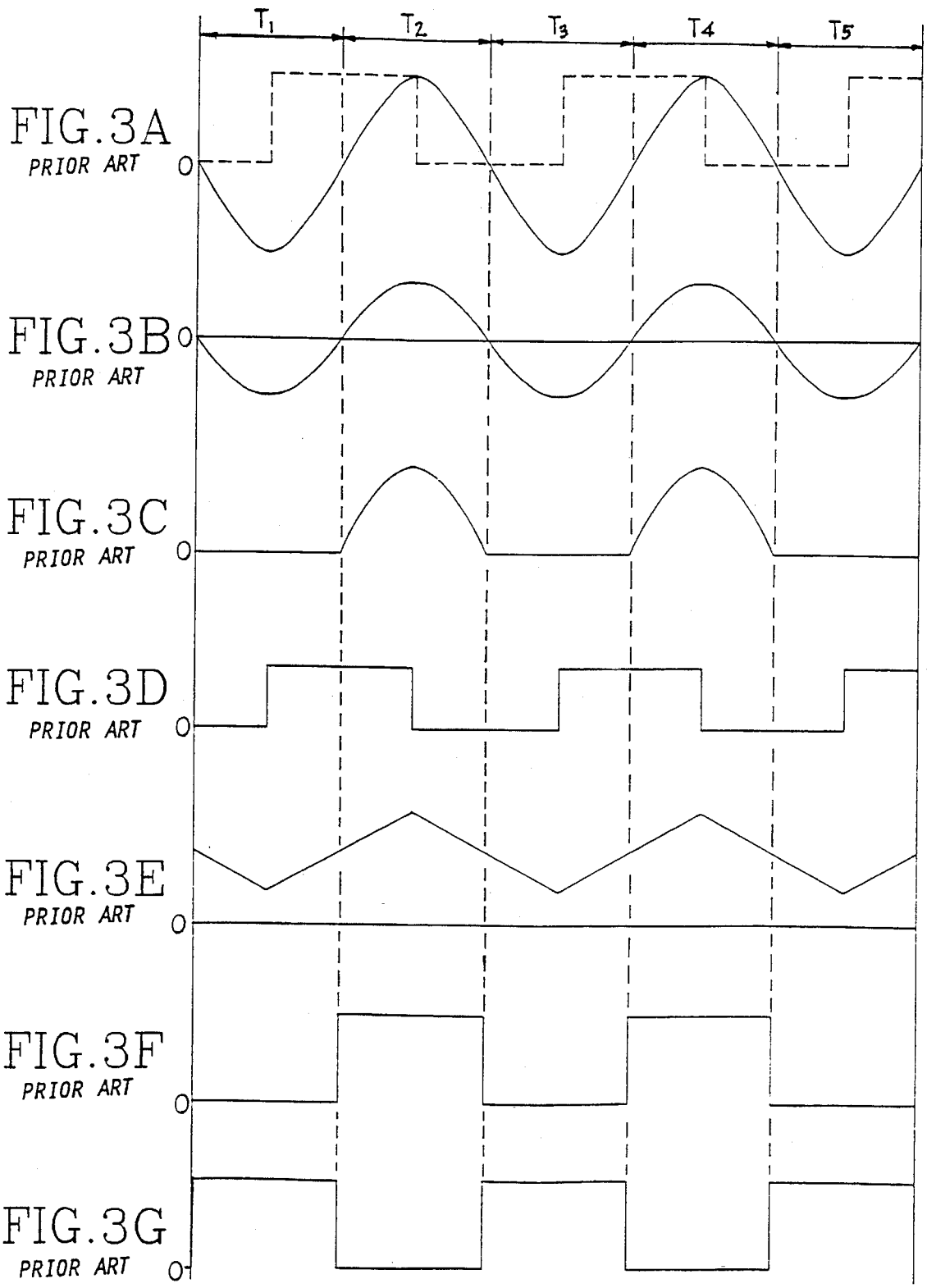
FIGS. 3A to 3G are waveform diagrams of input and output signals in components in FIGS. 1 and 2.
Figure 4:
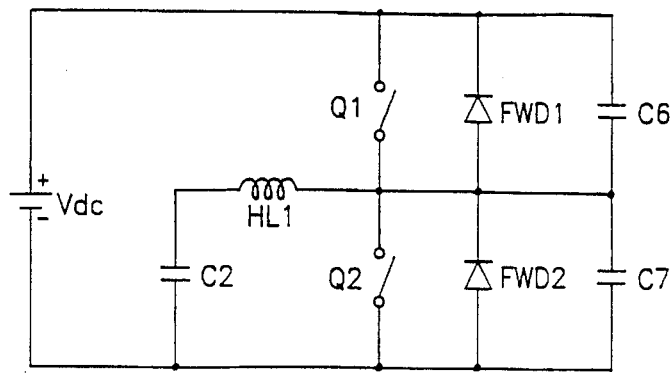
FIG. 4 is a circuit diagram illustrating connections of free-wheeling diodes and capacitors to an inverter in FIG. 1.
Figure 5A:
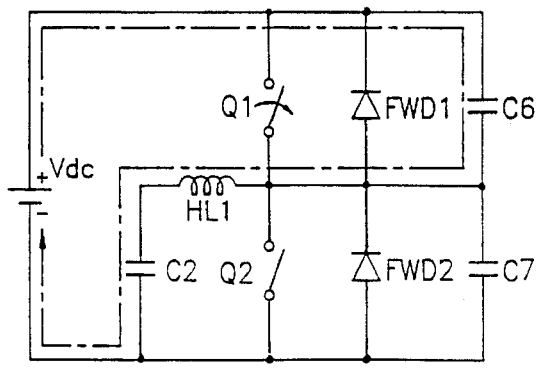
FIGS. 5A to 5D are circuit diagrams illustrating current paths in FIG. 4 in a dead time interval.
Figure 5B:
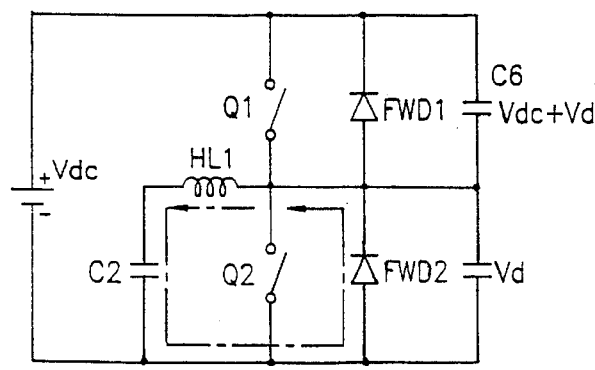
Figure 5C:
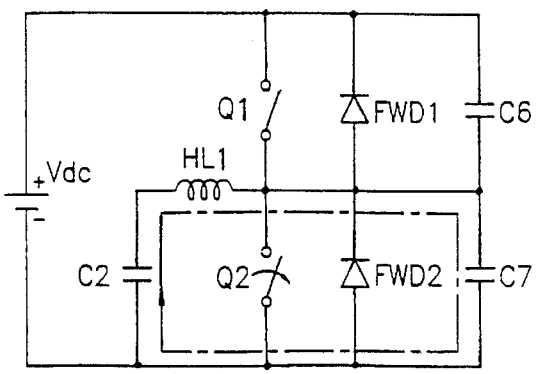
Figure 5D:
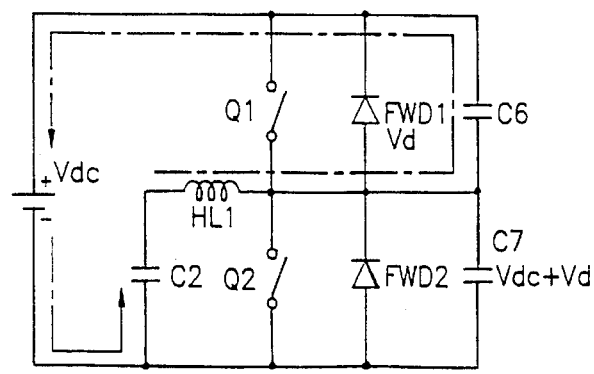
Figure 6:
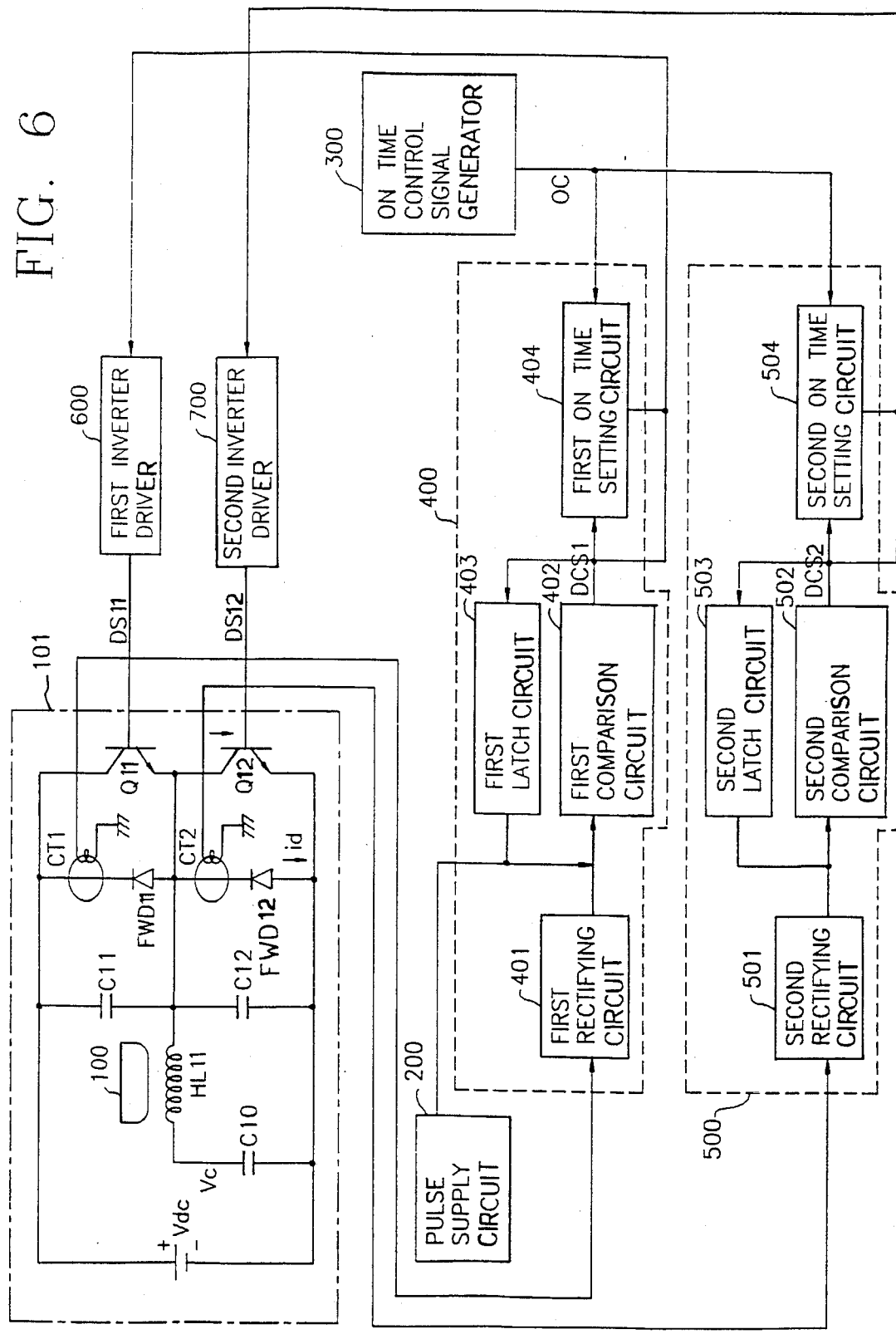
FIG. 6 is a schematic view illustrating an inverter power control circuit for a high-frequency heating apparatus in accordance with the present invention.

Referring to FIG. 6, there is shown a schematic view illustrating an inverter power control circuit for a high-frequency heating apparatus in accordance with the present invention. As shown in this drawing, the inverter power control circuit comprises an inverter 101 for inducing a commercial AC voltage to a high-frequency current in response to drive signals DS11 and DS12 to heat a container 100. To this end, the inverter 101 includes a working coil HL10, a resonance capacitor C10, capacitors C11 and C12, free-wheeling dimes FWD11 and FWD12 and transistors Q11 and Q12.

The inverter power control circuit further comprises a first current transformer CT1 for detecting a current flowing through the free-wheeling diode FWD11 in the inverter 101, a second current transformer CT2 for detecting a current flowing through the free-wheeling diode FWD12 in the inverter 101, a pulse supply circuit 200 for supplying a pulse to drive the inverter power control circuit at an initial state, an ON time control signal generator 300 for generating an ON time control signal OC to control ON times of the transistors Q11 and Q12 in the inverter 101, a first drive controller 400 for outputting a drive control signal DCS1 in response to the current detected by the first current transformer CT1, the pulse from the pulse supply circuit 200 and the ON time control signal OC from the ON time control signal generator 300 to control the ON time of the transistor Q11 in the inverter 101 to control a power of the inverter 101, and a second drive controller 500 for outputting a drive control signal DCS2 in response to the current detected by the second current transformer C12 and the ON time control signal OC from the ON time control signal generator 300 to control the ON time of the transistor Q12 in the inverter 101 to control the power of the inverter 101.

The inverter power control circuit further comprises a first inverter driver 600 for outputting the drive signal DS11 to the transistor Q11 in the inverter 101 in response to the drive control signal DCS1 from the first drive controller 400 to drive it, and a second inverter driver 700 for outputting the drive signal DS12 to the transistor Q12 in the inverter 101 in response to the drive control signal DCS2 from the second drive controller 500 to drive it.

Figure 7:
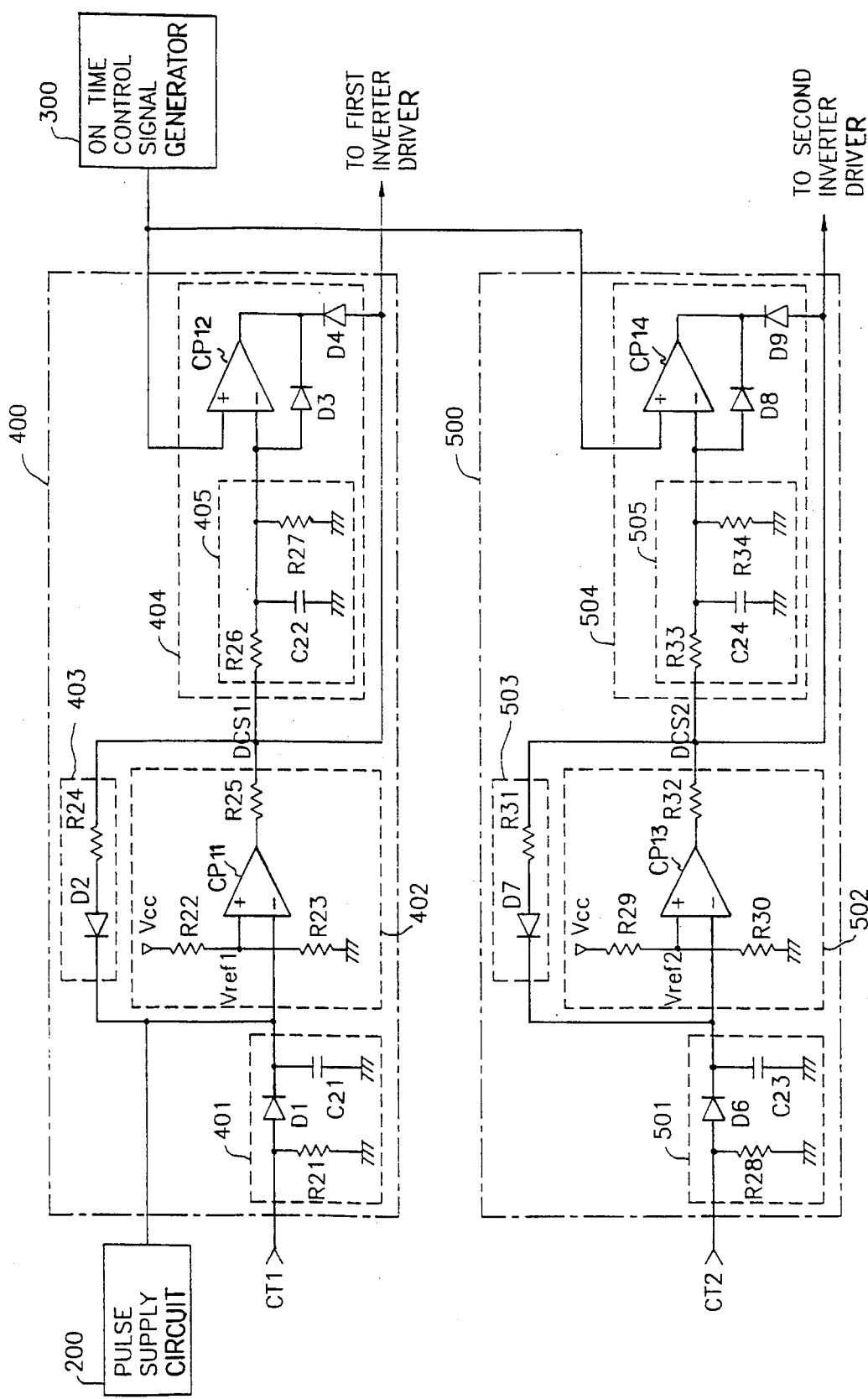
FIG. 7 is a detailed circuit diagram of first and second drive controllers in FIG. 6.

Referring to FIG. 7, there is shown a detailed circuit diagram of the first and second drive controllers 400 and 500 in FIG. 6. As shown in this drawing, the first drive controller 400 includes a first rectification circuit 401 for rectifying and smoothing the current detected by the first current transformer CT1. To this end, the first rectification circuit 401 includes a resistor R21, a diode D1 and a capacitor C21.

The first drive controller 400 further includes a first comparison circuit 402 for comparing the sum of a feedback signal and the pulse from the pulse supply circuit 200 or an output signal from the first rectification circuit 401 with a reference voltage Vref1 and outputting the drive control signal DCS1 to the first inverter driver 600 in accordance with the compared result. To this end, the first comparison circuit 402 includes resistors R22, R23 and R25 and at comparator CP11.

The first drive controller 400 further includes a first latch circuit 403 for latching the drive control signal DCS1 from the first comparison circuit 402 and outputting the latched signal as the feedback signal to the first comparison circuit 402. To this end, the first latch circuit 403 includes a resistor R24 and a diode D2.

The first drive controller 400 further includes a first ON time setting circuit 404 for controlling the drive control signal DCS1 from the first comparison circuit 402 in response to the drive control signal DCS1 from the first comparison circuit 402 and the ON time control signal OC from the ON time control signal generator 300 to set the ON time of the transistor Q11 in the inverter 101.

The second drive controller 500 includes a second rectification circuit 501 for rectifying and smoothing the current detected by the second current transformer CT2. To this end, the second rectification circuit 501 includes a resistor R28, a diode D6 and a capacitor C23.

The second drive controller 500 further includes a second comparison circuit 502 for comparing the sum of a feedback signal and an output signal from the second rectification circuit 501 with a reference voltage Vref2 and outputting the drive control signal DCS2 to the second inverter driver 700 in accordance with the compared result. To this end, the second comparison circuit 502 includes resistors R29, R30 and R32 and a comparator CP13.

The second drive controller 500 further includes a second latch circuit 503 for latching the drive control signal DCS2 from the second comparison circuit 502 and outputting the latched signal as the feedback signal to the second comparison circuit 502. To this end, the second latch circuit 503 includes a resistor R31 and a diode D7.

The second drive controller 500 further includes a second ON time setting circuit 504 for controlling the drive control signal DCS2 from the second comparison circuit 502 in response to the drive control signal DCS2 from the second comparison circuit 502 and the ON time control signal OC from the ON time control signal generator 300 to set the ON time of the transistor Q12 in the inverter 101.

The first ON time setting circuit 404 includes a charging circuit 405 for charging with a voltage of the drive control signal DCS1 from the first comparison circuit 402, a comparator CP12 for comparing the voltage being charged on the charging circuit 405 with a voltage of the ON time control signal OC from the ON time control signal generator 300 and outputting the resultant signal, and diodes D3 and D4 for conducting in response to an output signal from the comparator CP12.

The second ON time setting circuit 504 includes a charging circuit 505 for charging with a voltage of the drive control signal DCS2 from the second comparison circuit 502, a comparator CP14 for comparing the voltage being charged on the charging circuit 505 with a voltage of the ON time control signal OC from the ON time control signal generator 300 and outputting the resultant signal, and diodes D8 and D9 for conducting in response to an output signal from the comparator CP14.

The operation of the inverter power control circuit for the high-frequency heating apparatus with the above-mentioned construction in accordance with the present invention will hereinafter be described in detail with reference to FIG. 8 which is a waveform diagram of the input and output signals in the components of the inverter 101 in FIG. 6.

First, the pulse supply circuit 200 supplies a high level pulse to the first drive controller 400 to drive the inverter power control circuit at the initial state. In the first comparison circuit 402 of the first drive controller 400, the high level pulse from the pulse supply circuit 200 is applied to a non-inverting input terminal (+) of the comparator CP11.

Then in the first comparison circuit 402, a supply voltage Vcc is divided by the resistors R22 and R23 and applied as the reference voltage Vref1 to an inverting input terminal (−) of the comparator CP11. Namely, Vref1=R23·Vcc/(R22+R23). The comparator CP11 compares a voltage of the high level pulse at its non-inverting input terminal (+) with the reference voltage Vref1 at its inverting input terminal (−) and outputs the drive control signal DCS1 in accordance with the compared result. At this time, the drive control signal DCS1 from the comparator CP11 is high in level.

The high level drive control signal DCS1 from the comparator CP11 is latched by the resistor R24 and the diode D2 in the first latch circuit 403 and then fed back to the non-inverting input terminal (+) of the comparator CP11. This feedback operation allows the drive control signal DCS1 from the comparator CP11 to remain at its high state.

In the first ON time setting circuit 404, the voltage of the high level drive control signal DCS1 from the first comparison circuit 402 is charged on a capacitor C22 through a resistor R26 in the charging circuit 405 and then applied to an inverting input terminal (−) of the comparator CP12.

The ON time control signal OC from the ON time control signal generator 300 is applied to a non-inverting input terminal (+) of the comparator CP12. Then, the comparator CP12 compares the charged voltage at its inverting input terminal (−) with the voltage of the ON time control signal OC at its non-inverting input terminal (+) and outputs a high level signal in accordance with the compared result.

The high level signal from the comparator CP12 makes the diodes D3 and D4 nonconductive. As a result, the high level drive control signal DCS1 from the first comparison circuit 402 is transferred to the first inverter driver 600.

The first inverter driver 600 outputs the drive signal DS11 to the inverter 101, which is high in level in response to the high level drive control signal DCS1 from the first drive controller 400.

Then in the inverter 101, the transistor Q11 is turned on in response to the high level drive signal DS11 from the first inverter driver 600. As the transistor Q11 is turned on, a current flows through a repetitive loop of the transistor Q11, the working coil HL11 and the resonance capacitor C10.

Figure 8:
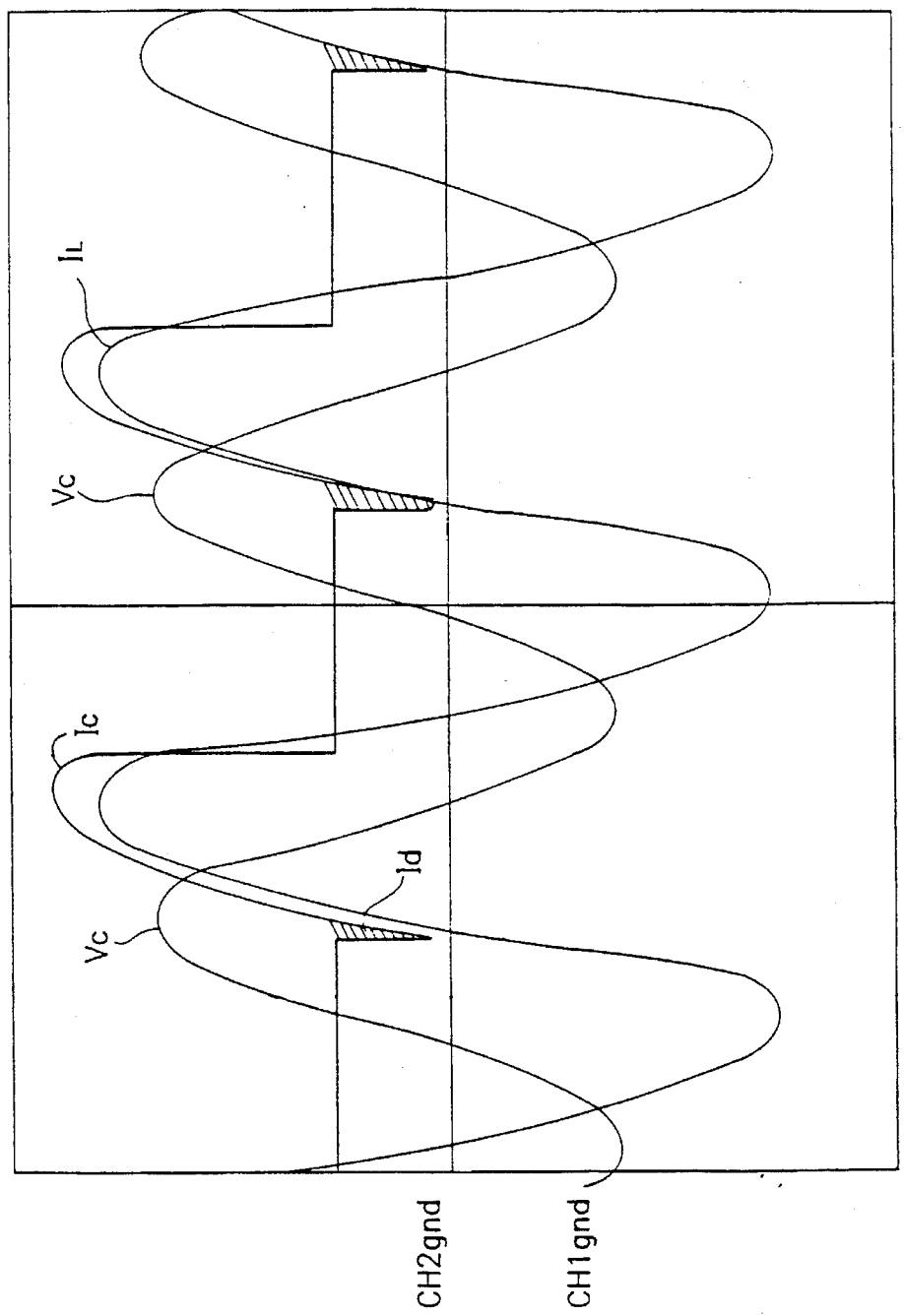
FIG. 8 is a waveform diagram of input and output signals in components of an inverter in FIG. 6.

As a result, a high-frequency current $I_L$ as shown in FIG. 8 is induced in the working coil HL11, thereby causing a voltage Vc as shown in FIG. 8 to be charged on the resonance capacitor C10.

Thereafter, in the first ON time setting circuit 404 of the first drive controller 400, the output signal from the comparator CP12 goes from high to low in level just after the voltage being charged on the capacitor C22 in the charging circuit 405 is in accord with the voltage of the ON time control signal OC from the ON time control signal generator 300.

The low level signal from the comparator CP12 makes the diodes D3 and D4 conductive. As a result, the high level drive control signal DCS1 from the first comparison circuit 402 is passed through the diode D4.

As a result, the high level drive control signal DCS1 from the first comparison circuit 402 goes low in level and is then applied to the first inverter driver 600, thereby causing the drive signal DS11 from the first inverter driver 600 to become low in level.

Then in the inverter 101, the transistor Q11 is turned off in response to the low level drive signal DS11 from the first inverter driver 600.

When the transistors Q11 and Q12 are simultaneously turned off, namely, in a dead time interval, the current flowing through the transistor Q11 is passed through a repetitive loop of the capacitor C11, the working coil HL11 and the resonance capacitor C10.

A voltage resulting from the passed current is charged on the capacitor C11. From the moment that the voltage being charged on the capacitor C11 exceeds an input voltage Vdc, a reverse voltage is generated by the excess on the capacitor C12 and then applied across the free-wheeling diode FWD12.

As a result, a current flows through a repetitive loop of the free-wheeling diode FWD12, the working coil HL11 and the resonance capacitor C10.

At this time, the current flowing through the free-wheeling diode FWD12 is detected by the second current transformer CT2 and then sequentially rectified and smoothed by the resistor R28, the diode D6 and the capacitor C23 in the second rectification circuit 501 of the second drive controller 500.

In the second comparison circuit 502, the rectified and smoothed voltage from the second rectification circuit 501 is applied to a non-inverting input terminal (+) of the comparator CP13. The supply voltage Vcc is divided by the resistors R29 and R30 and applied as the reference voltage Vref2 to an inverting input terminal (−) of the comparator CP13. Namely, Vref2=R30·Vcc/(R29+R30). The comparator CP13 compares the rectified and smoothed voltage at its non-inverting input terminal (+) with the reference voltage Vref2 at its inverting input terminal (−) and outputs the drive control signal DCS2 in accordance with the compared result. At this time, the drive control signal DCS2 from the comparator CP13 is high in level.

The high level drive control signal DCS2 from the comparator CP13 is latched by the resistor R31 and the diode D7 in the second latch circuit 503 and then fed back to the non-inverting input terminal (+) of the comparator CP13. This feedback operation allows the drive control signal DCS2 from the comparator CP13 to remain at its high state.

In the second ON time setting circuit 504, the voltage of the high level drive control signal DCS2 from the second comparison circuit 502 is charged on a capacitor C24 through a resistor R33 in the charging circuit 505 and then applied to an inverting input terminal (−) of the comparator CP14.

The ON time control signal OC from the ON time control signal generator 300 is applied to a non-inverting input terminal (+) of the comparator CP14. Then, the comparator CP14 compares the charged voltage at its inverting input terminal (−) with the voltage of the ON time control signal OC at its non-inverting input terminal (+) and outputs a high level signal in accordance with the compared result.

The high level signal from the comparator CP14 makes the diodes D8 and D9 nonconductive. As a result, the high level drive control signal DCS2 from the second comparison circuit 502 is transferred to the second inverter driver 700.

The second inverter driver 700 outputs the drive signal DS12 to the inverter 101, which is high in level in response to the high level drive control signal DCS2 from the second drive controller 500.

Then in the inverter 101, the transistor Q12 is turned on in response to the high level drive signal DS12 from the second inverter driver 700. As the transistor Q12 is turned on, a current flows through a repetitive loop of the resonance capacitor C10, the working coil HL11 and the transistor Q12.

As a result, the voltage charged on the resonance capacitor C10 is discharged therefrom as shown in FIG. 8, thereby causing the high-frequency current $I_L$ as shown in FIG. 8 to flow through the working coil HL11. In result, a current Ic as shown in FIG. 8 flows through the transistor Q12.

Thereafter, in the second ON time setting circuit 504 of the second drive controller 500, the output signal from the comparator CP14 goes from high to low in level just after the voltage being charged on the capacitor C24 in the charging circuit 505 is in accord with the voltage of the ON time control signal OC from the ON time control signal generator 300.

The low level signal from the comparator CP14 makes the diodes D8 and D9 conductive. As a result, the high level drive control signal DCS2 from the second comparison circuit 502 is passed through the diode D9.

Consequently, the high level drive control signal DCS2 from the second comparison circuit 502 goes low in level and is then applied to the second inverter driver 700, thereby causing the drive signal DS12 from the second inverter driver 700 to become low in level.

Then in the inverter 101, the transistor Q12 is turned off in response to the low level drive signal DS12 from the second inverter driver 700.

When the transistors Q11 and Q12 are simultaneously turned off, namely, in the dead time interval, the current Ic flowed through the transistor Q12 is passed through a repetitive loop of the resonance capacitor C10, the working coil HL11 and the capacitor C12.

A voltage resulting from the passed current is charged on the capacitor C12. From the moment that the voltage being charged on the capacitor C12 exceeds the input voltage Vdc, a reverse voltage is generated by the excess on the capacitor C11 and then applied across the free-wheeling diode FWD11.

As a result, a current flows through a repetitive loop of the resonance capacitor C10, the working coil HL11 and the free-wheeling diode FWD11.

At this time, the current flowing through the free-wheeling diode FWD11 is detected by the first current transformer CT1 and then sequentially rectified and smoothed by the resistor R21, the diode D1 and the capacitor C21 in the first rectification circuit 401 of the first drive controller 400.

In the first comparison circuit 402, the rectified and smoothed voltage from the first rectification circuit 401 is applied to the non-inverting input terminal (+) of the comparator CP11, the inverting input terminal (−) of which is applied with the reference voltage Vref1. Then, the comparator CP11 compares the rectified and smoothed voltage at its non-inverting input terminal (+) with the reference voltage Vref1 at its inverting input terminal (−) and outputs the drive control signal DCS1 in accordance with the compared result. At this time, the drive control signal DCS1 from the comparator CP11 is high in level.

The high level drive control signal DCS1 from the comparator CP11 is latched by the resistor R24 and the diode D2 in the first latch circuit 403 and then fed back to the non-inverting input terminal (+) of the comparator CP11, thereby allowing the drive control signal DCS1 from the comparator CP11 to remain at its high state.

In the first ON time setting circuit 404, the voltage of the high level drive control signal DCS1 from the first comparison circuit 402 is charged on the capacitor C22 through the resistor R26 in the charging circuit 405 and then applied to the inverting input terminal (−) of the comparator CP12, the non-inverting input terminal (+) of which is applied with the ON time control signal OC from the ON time control signal generator 300.

Then, the comparator CP12 compares the charged voltage at its inverting input terminal (−) with the voltage of the ON time control signal OC at its non-inverting input terminal (+) and outputs a high level signal in accordance with the compared result.

The high level signal from the comparator CP12 makes the diodes D3 and D4 nonconductive. As a result, the high level drive control signal DCS1 from the first comparison circuit 402 is transferred to the first inverter driver 600.

In response to the high level drive control signal DCS1 from the first drive controller 400, the drive signal DS11 from the first inverter driver 600 becomes high in level, thereby causing the transistor Q11 in the inverter 101 to be turned on.

Subsequently, the inverter 101 performs the above operation repeatedly. As apparent from the above description, according to the present invention, the inverter power control circuit for the high-frequency heating apparatus can perform a perfect self-oscillation with no use of a separate oscillation circuit because it supplies only the pulse for the initial operation. Also, the inverter power control circuit requires no dead time generator for preventing the switching devices from being simultaneously turned on. Therefore, the inverter power control circuit is simple in construction.

Moreover, since the dead time internal is automatically generated at the minimum during the operation of the circuit, the power regulation can be carried out at the optimum over the most ideal range according to a variation in the input voltage or power. Therefore, the switching devices are subjected to minimum current stresses and a short-circuit current is not generated, so that the switching devices can be protected from a damage resulting from a dead time setting error.

Furthermore, the switching devices are switched at minimum amounts of conducting currents of the free-wheeling diodes for the zero voltage switching operation. Therefore, the free-wheeling diodes can be subjected to minimum current stresses at a desired load amount.

Although the preferred embodiments of the present invention have been disclosed for illustrative purposes, those skilled in the an will appreciate that various modifications, additions and substitutions are possible, without departing from the scope and spirit of the invention as disclosed in the accompanying claims.

What is claimed is:

1. In a high-frequency, half-bridge type heating apparatus comprising an inverter, wherein said inverter includes first and second switching devices connected to first and second inverter drive signal lines, respectively, a first free-wheeling diode and a first capacitor connected in parallel to said first switching device, a second free-wheeling diode and a second capacitor connected in parallel to said second switching device, and a working coil and a resonance capacitor connected in series to a node between said first and second capacitors, a node between said first and second free-wheeling diodes and a node between said first and second switching devices, respectively, a circuit for controlling said inverter comprising:

first current detection means connected in said circuit for detecting a current flowing through said first free-wheeling diode in said inverter;

second current detection means connected in said circuit for detecting a current flowing through said second free-wheeling diode in said inverter;

pulse supply means for supplying a pulse to drive the circuit at an initial state;

ON time control signal generation means for generating an ON time control signal to control ON times of said first and second switching devices in said inverter;

first drive control means for generating a first drive control signal in response to the current detected by said first current detection means, the pulse from said pulse supply means and the ON time control signal from said ON time control signal generation means to control the power of said inverter and for outputting the generated first drive control signal, said pulse supply means connected to said first drive control means; and second drive control means for generating a second drive control signal in response to the current detected by said second current detection means and the ON time control signal from said ON time control signal generation means to control the power of said inverter and for outputting the generated second control signal, said ON time control signal generation means being coupled to said first and second drive control means.

2. The circuit as set forth in claim 1, wherein said first drive control means includes:

rectification means for rectifying and smoothing the current detected by said first current detection means;

comparison means for comparing the sum of a feedback signal and the pulse from said pulse supplying means or an output signal from said rectification means with a reference voltage and outputting the first drive control signal in accordance with the compared result;

latch means for latching the first drive control signal from said comparison means and outputting the latched signal as the feedback signal to said comparison means to maintain the level of the first drive control signal; and ON time setting means for controlling the first drive control signal from said comparison means in response to the ON time control signal from said ON time control signal generation means to set the ON time of said first switching device in said inverter.

3. The circuit as set forth in claim 2, wherein said ON time setting means includes:

charging means for charging with a voltage of the first drive control signal from said comparison means;

a comparator for comparing the voltage being charged on said charging means with a voltage of the ON time control signal from said ON time control signal generation means and outputting the resultant signal; and first and second diodes for switching in response to an output signal from said comparator to maintain the level of the first drive control signal.

4. The circuit as set forth in claim 1, wherein said second drive control means includes:

rectification means for rectifying and smoothing the current detected by said second current detection means;

comparison means for comparing the sum of a feedback signal and an output signal from said rectification means with a reference voltage and outputting the second drive control signal in accordance with the compared result;

latch means for latching the second drive control signal from said comparison means and outputting the latched signal as the feedback signal to said comparison means to maintain the level of the second drive control signal; and ON time setting means for controlling the second drive control signal from said comparison means in response to the ON time control signal from said ON time control signal generation means to set the ON time of said second switching device in said inverter.

5. The circuit as set forth in claim 4, wherein said ON time setting means includes:

charging means for charging with a voltage of the second drive control signal from said comparison means;

a comparator for comparing the voltage being charged on said charging means with a voltage of the ON time control signal from said ON time control signal generation means and outputting the resultant signal; and first and second diodes for conducting in response to an output signal from said comparator to maintain the level of the second drive control signal.

* * * * *